Patented Jan. 12, 1943

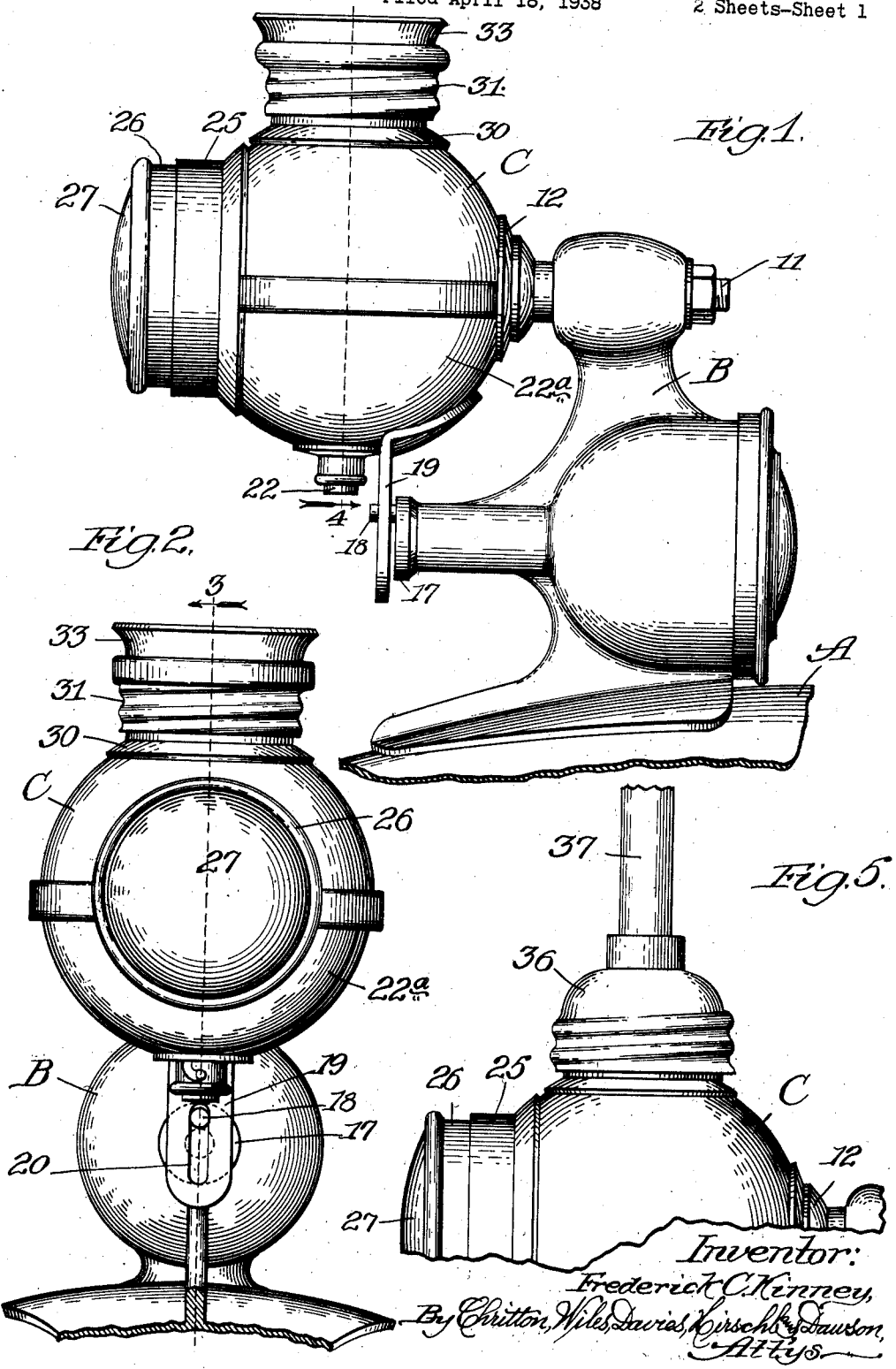

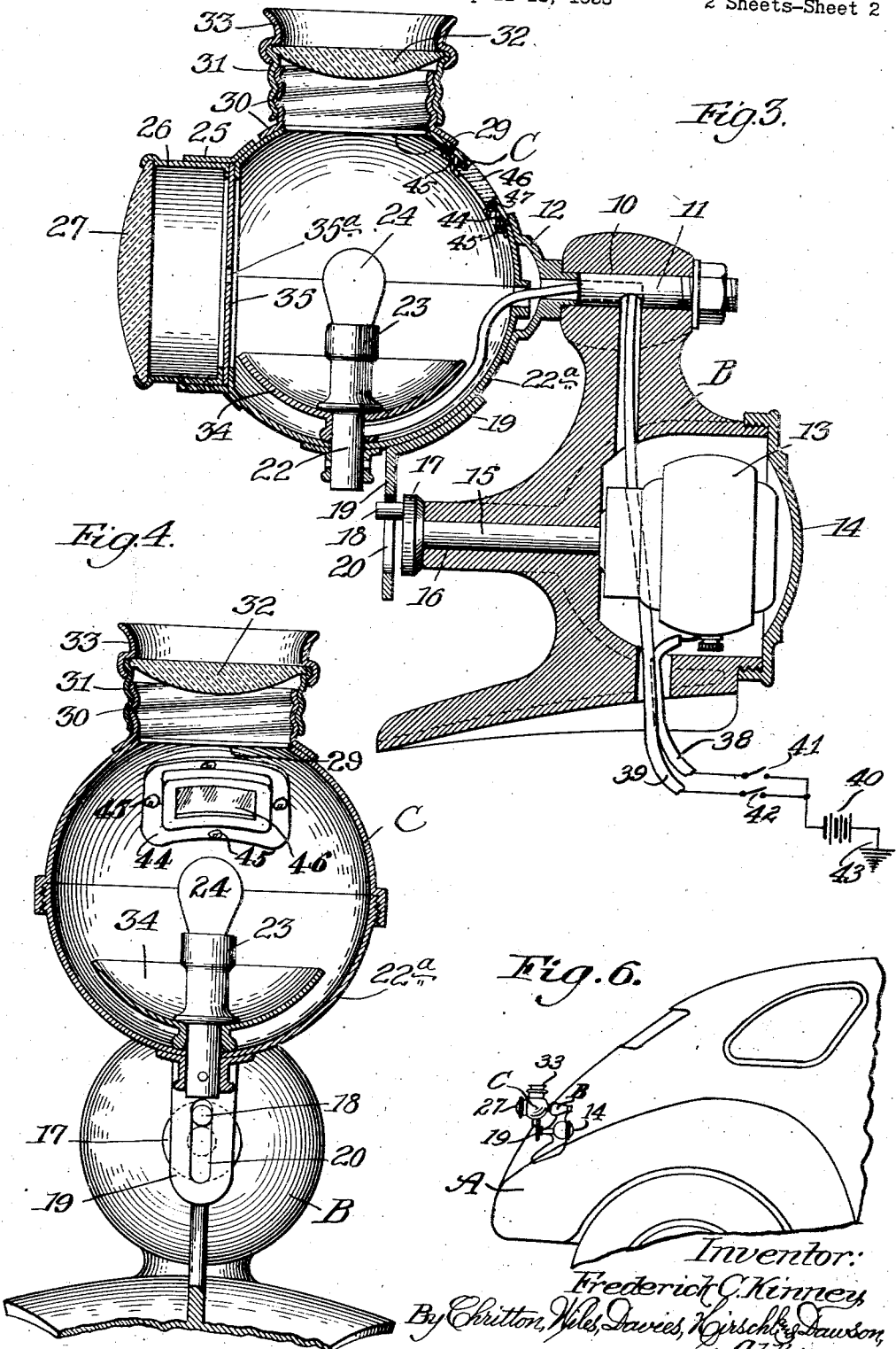

2,308,085

UNITED STATES PATENT OFFICE 2,308,085

WARNING LIGHT

Frederick C. Kinney, Evanston, Ill.

Application April 18, 1938, Serial No. 202,806

4 Claims. (Cl. 177—324)

This invention relates to a beacon or warning light for any vehicle on land, or water. The invention is also applicable to a beacon light for use at intersections and for a number of other uses.

Lights, as now carried on automobiles, are usually provided with lens or glass providing a light source throwing a beam of light in one direction, usually in a horizontal direction. There is need of a beam of light in a vertical direction because of the tendency of the horizontal spot to be obscured by a low hanging fog along the road, particularly in dips in the road, because of small clouds of smoke or combustion gases discharged from the car, because of bushes, obstructions to visibility, etc., about intersections, and because of a number of other obstacles which are well known.

An object of the present invention is to provide with the conventional rear light of the vehicle, a vertical shaft or column of light rays which extend well above the rear or tail light and preferably above the vehicle itself. Such a shaft of light identifies the vehicle even though there are a number of obstacles between the driver of another car and the car so equipped. A further object is to provide such a light for any portion of a vehicle. A still further object is to provide a beacon or warning light which will serve to warn drivers at intersections and other points where a warning of this character is needed. Other specific objects and advantages will appear as the specification proceeds.

The invention is illustrated, in preferred embodiments, by the accompanying drawings, in which—

Figure 1 is a side view in elevation of a rear portion of an automobile or vehicle carrying a warning light embodying my invention; Fig. 2, a broken front view in elevation; Fig. 3, a longitudinal sectional view, the section being taken as indicated at line 3 of Fig. 2; Fig. 4, a transverse sectional view, the section being taken as indicated at line 4 of Fig. 1; Fig. 5, a broken view in elevation of a modified form of my invention; and Fig. 6 is a side elevational view partly broken away showing the warning light mounted on an automobile.

In the illustration given, A designates the rear portion of an automobile or any other suitable support; B designates a motor equipped frame for supporting the light; and C designates a warning light embodying my invention.

The rear portion A of the automobile or vehicle, as indicated by the letter A, may be any suitable portion for supporting the device. It is obviously unnecessary to illustrate the entire automobile or other vehicle used or such other support as may be employed.

The casing B may be of any suitable construction. In the illustration given, it provides at its upper side a journal 10 for receiving the shaft 11 equipped with a bracket 12 carrying the light casing C. The lower portion of the casing provides a chamber for the motor 13, the chamber being accessible through the threaded cap 14. Shaft 15, driven by the motor 13, is journaled within the bearing 16 and is equipped at its outer end with a driving disk 17 equipped with an eccentric pin 18. A lever 19, provided with a slot 20 receiving the pin 18, is secured to the casing of the light C by welding or any other suitable means.

The casing C may be of any suitable construction. In the illustration given, I provide a metal casing member 22a provided at its lower side with an opening for receiving the tube 22 upon which the light bulb support 23 and light bulb 24 are supported. Suitable electrical connections 38 and 39 lead from a battery 40 or other source of power to the motor 13 and lamp 24. As illustrated, the connections 38 and 39 may pass through the wall of the casing B and the connection 39 may extend into the shaft 11 and thence into the casing C and the tube 22 in which it connects with the base of the lamp 24. Any other desired arrangement may be made for the electrical connections. As shown, the switches 41 and 42 may be placed in the line of the electrical connections 38 and 39 respectively so that the motor 13 and lamp 24 may be independently operated. The ground connection 43 may be connected to the frame of the vehicle.

The casing C is provided at its rear side with an opening and with a sleeve member 25 extending rearwardly from the opening. Within the sleeve is mounted a lens-carrying tube 26. The lens 27, which may be colored or otherwise, is supported within the tube 26. A suitable opening 28 may be provided for directing light upon the license plate of the vehicle. The license plate aperture 28 may be located at any suitable part of the light casing where it is desired to cast rays upon the license plate.

Around the aperture 28 may be mounted the open frame 44. The frame 44 is mounted inside the casing 22a and is secured to the casing 22a by screws 45. A glass window 46 may be mounted in the aperture and secured in place by the frame 44. If desired, the window 46 may be protected from engagement with the casing 22a by a washer 47 of rubber or other material.

The casing 22a is provided at its top side with another opening 29 and extending upwardly from the opening is a threaded tube 30. Engaging the threaded tube 30 is a second threaded extension tube 31 which carries the lens 32 which is held in position against member 31 by the cap member 33. With this construction, the lens 32 may be lowered or raised to cast the desired type of vertical rays. I prefer to employ a lens and an arrangement with respect to the light 24 which will cast substantially vertical and parallel rays of light to form a column of light. To further aid in the forming of a column of light, I provide a reflector 34 supported below light 23, as shown more clearly in Figs. 3 and 4.

Since it is desired that the greater amount of the light be transmitted vertically and less light in a rear direction, I have shown a semi-transparent screen or partial reflector 35 supported as shown more clearly in Fig. 3 and may be provided with a small central aperture 35a. This reflector, which may be formed of glass, composition material or any other suitable material, is preferably provided with a reflective surfacing on its inner side and which may partially transmit a portion of light rearwardly but reflects part of it, thus aiding the reflector 34 while simultaneously decreasing to a partial extent the intensity of the light beams passing rearwardly.

In the operation of the device, the signal light may be maintained and utilized in a fixed or nonmoving position. Under this arrangement, the motor 13 is not employed and, if desired, may be entirely omitted.

The light may be made to flash on and off intermittently, using such well-known construction as a flasher button inserted in the light socket, or automatic circuit breaking arrangement. If desired, a manual-control push button switch may be installed at a distant point near the driver's hand, permitting switching light on and off as a signal; also permitting switching on motor and light simultaneously, changing direction of light to oblique right or left, to signal right or left turn. Or switch may be mounted on front steering mechanism such that when wheel starts turning right or left, device will automatically throw light in an oblique right or left direction accordingly. As shown in the drawings, a pair of switches may be used for independently operating the motor and the light.

The lens 32 is preferably adjusted to give substantially parallel vertical beams, forming a column of light so that with the light rays from the bulb 24 and the reflector 34, a straight column of light above the lamp C and extending above the automobile or vehicle is formed. The light beam thus formed is of high luminosity and intensity.

By referring to substantially parallel beams of light in the column, it is meant that many of the beams are actually parallel to each other, while those that are not parallel are disposed at small angles with respect to each other. Similarly, it will be understood that not all of the light emitted by the lamp is in the vertical column referred to. However, because of the arrangement of the bulb 24, the reflector 34 and the lens 32, a large portion of the light emitted by the lamp is concentrated in the vertical column, and the beams and rays passing through the lens 32 which are not in the vertical column are so scattered as to not interfere with the effect of the vertical pencil-like column. Such a light is visible above smoke or low-hanging fog, and is also visible over the low obstructions as the car approaches an intersection. For further warning purposes, the motor 13 may be operated preferably to turn the shaft 15 relatively slowly whereby the driving disk 17 and pin 18 rotate. The travel of pin 18 in the slot 20 causes the strap 19 and the casing 22a to oscillate, thus causing the column of light to swing from one side to the other.

It will be further understood that the apparatus may be employed not only upon automobiles, railways, boats, aeroplanes, or other vehicles, but also upon a fixed support as, for example, at intersections, railway crossings, railway and highway warnings for bridges, curves, etc.

The column of light, whether stationary, rotating, swinging, or fluctuating on and off, gives a driver warning of automobiles approaching the top of a hill, or intersection as to the location of such automobiles, or intersection, the column extending well above fog or smoke blankets near the ground and above obstructions, such as hills, buildings, fences, signboards, shrubs, trees, etc.

The column of light as formed by the lens illustrated, may also be formed in other suitable ways. For example, gas filled tubes may be employed through which a long arc of light may be formed. Also, a quartz shaft or light conductive material may be employed to transmit the light. In the illustration given, in Fig. 5, I provide a screw member support 36 holding the quartz shaft or light conductive material 37. The light travels longitudinally through the quartz 37, thus making the quartz shaft incandescent in appearance and forming a vertical shaft of light.

With the quartz shaft construction shown in Fig. 5, the light passes through the quartz shaft and extends from the end of the shaft in a column similar to that formed by the lens 32. This column extends upwardly for a substantial distance and is visible above fog or smoke blankets and obstructions near the ground. In addition, the quartz shaft itself becomes incandescent in appearance and produces a very striking signal which may be observed when the automobile is seen.

For oscillating the lamp, I have shown a motor means for oscillating the casing. It will be understood that other movements may be obtained other than the oscillating movement, and it will also be understood that many other means may be employed for swinging, rotating or moving the column of light in any manner. There are well known equivalents employed for shifting the light beam, such as, for example, shifting the light bulb itself, shifting the lens, etc.

I claim:

1. A light comprising a light casing, said casing being rotatable about a horizontal axis and being provided with a top opening and a rear opening with said axis passing through the center of said rear opening, a source of light in said casing adapted to illuminate both openings, a reflector about said light source directing light rays toward said top opening and light directing beam-forming means in said top opening for directing light rays therefrom in a substantially parallel vertical column of rays.

2. An automobile light comprising a light casing provided with a rear opening and with a top opening, a source of light in said casing, a reflector about said source of light directing rays toward said top opening, a lens in said top open-